(12) United States Patent
Satish et al.

(10) Patent No.: US 9,223,966 B1
(45) Date of Patent: Dec. 29, 2015

(54) SYSTEMS AND METHODS FOR REPLICATING COMPUTING SYSTEM ENVIRONMENTS

(71) Applicant: Symantec Corporation, Mountain View, CA (US)

(72) Inventors: Sourabh Satish, Fremont, CA (US); Abubakar A. Wawda, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/269,145

(22) Filed: May 4, 2014

(51) Int. Cl.
G06F 21/00 (2013.01)
G06F 21/53 (2013.01)
G06F 9/455 (2006.01)

(52) U.S. Cl.
CPC ............ *G06F 21/53* (2013.01); *G06F 9/45533* (2013.01)

(58) Field of Classification Search
CPC combination set(s) only.
See application file for complete search history.

(56) References Cited

U.S. PATENT DOCUMENTS

| | | | |
|---|---|---|---|
| 6,128,647 A | 10/2000 | Haury | |
| 6,931,546 B1 | 8/2005 | Kouznetsov et al. | |
| 7,028,305 B2 | 4/2006 | Schaefer | |
| 7,117,495 B2 | 10/2006 | Blaser et al. | |
| 7,162,724 B2 | 1/2007 | Blaser et al. | |
| 7,165,260 B2 | 1/2007 | Blaser et al. | |
| 7,451,196 B1 | 11/2008 | de Vries et al. | |
| 7,461,086 B1 | 12/2008 | Hurren et al. | |
| 7,461,096 B1 | 12/2008 | Hurren et al. | |
| 7,496,931 B2 | 2/2009 | Cook et al. | |
| 7,512,977 B2 | 3/2009 | Cook et al. | |
| 7,519,963 B1 | 4/2009 | Blaser et al. | |
| 7,542,988 B1 | 6/2009 | Cook et al. | |
| 7,549,164 B2 | 6/2009 | Cook et al. | |
| 7,620,956 B2 | 11/2009 | Cook et al. | |
| 7,877,413 B1 | 1/2011 | Cook et al. | |
| 7,886,291 B1 | 2/2011 | Jones et al. | |

(Continued)

FOREIGN PATENT DOCUMENTS

| | | |
|---|---|---|
| EP | 1083483 A1 | 3/2001 |
| JP | 2005284925 A | 10/2005 |

OTHER PUBLICATIONS

Jared Blaser; Process Tracking Application Layered System; U.S. Appl. No. 11/324,571, filed Jan. 3, 2006.
Lance TeNgaio; Distributed Application Virtualization; U.S. Appl. No. 12/142,549, filed Jun. 19, 2008.

(Continued)

*Primary Examiner* — Ghazal Shehni
(74) *Attorney, Agent, or Firm* — ALG Intellectual Property, LLC

(57) ABSTRACT

The disclosed computer-implemented method for replicating computing system environments may include (1) identifying each application installed on a plurality of computing systems, (2) creating, within a virtual machine image, virtual containers that store each application installed on the plurality of computing systems, (3) determining that a potentially malicious file is directed to a target computing system within the plurality of computing systems, (4) identifying each application installed on the target computing system, (5) in response to determining that the file is directed to the target computing system, replicating a configuration of the target computing system within the virtual machine image by, for each application installed on the target computing system, activating a virtual container that stores the application, and (6) determining how the file would affect the target computing system by sending the file to the virtual machine image and analyzing how the file impacts the virtual machine image.

20 Claims, 8 Drawing Sheets

(56) References Cited

U.S. PATENT DOCUMENTS

| | | |
|---|---|---|
| 7,945,897 B1 | 5/2011 | Cook |
| 7,970,789 B1 | 6/2011 | Blaser et al. |
| 8,010,961 B1 | 8/2011 | Cook et al. |
| 8,060,940 B2 | 11/2011 | McCorkendale et al. |
| 8,108,346 B1 | 1/2012 | Hurren et al. |
| 8,112,392 B1 | 2/2012 | Bunnell et al. |
| 8,112,767 B1 | 2/2012 | Cook |
| 8,225,316 B1 | 7/2012 | Bunnell et al. |
| 8,261,254 B2 | 9/2012 | Cook |
| 8,291,407 B2 | 10/2012 | Greenwood et al. |
| 8,302,108 B1 | 10/2012 | Hurren et al. |
| 8,341,648 B1 | 12/2012 | Cook |
| 8,365,297 B1 * | 1/2013 | Parshin et al. ............ 726/26 |
| 8,407,700 B2 | 3/2013 | Bunnell et al. |
| 8,612,994 B1 | 12/2013 | Sanderson |
| 8,650,166 B1 | 2/2014 | Cook et al. |
| 2002/0083183 A1 | 6/2002 | Pujare et al. |
| 2003/0233647 A1 | 12/2003 | Blaser et al. |
| 2004/0078568 A1 | 4/2004 | Pham et al. |
| 2004/0107179 A1 | 6/2004 | Dalrymple, III et al. |
| 2004/0139128 A1 | 7/2004 | Becker et al. |
| 2004/0139309 A1 | 7/2004 | Gentil et al. |
| 2005/0172279 A1 | 8/2005 | Cook et al. |
| 2007/0180450 A1 | 8/2007 | Croft et al. |
| 2008/0091792 A1 | 4/2008 | Mei et al. |
| 2009/0192780 A1 | 7/2009 | Carbone et al. |
| 2010/0138823 A1 | 6/2010 | Thornley |
| 2010/0153924 A1 | 6/2010 | Andrews |
| 2011/0061045 A1 | 3/2011 | Phillips |
| 2011/0078794 A1 * | 3/2011 | Manni et al. ............ 726/23 |

OTHER PUBLICATIONS

Cynthia Bringhurst; Systems and Methods for Virtualizing Software Associated with External Computer Hardware Devices; U.S. Appl. No. 12/554,413, filed Sep. 4, 2009.

Bradley Baird; Systems and Methods for Merging Virtual Layers; U.S. Appl. No. 12/843,098, filed Jul. 26, 2010.

Michael Spertus, et al.; Systems and Methods for Using Virtualization to Implement Information Rights Management; U.S. Appl. No. 12/715,213, filed Mar. 1, 2010.

Bradley Baird; Systems and Methods for Using Virtualization of Operating-System-Level Components to Facilitate Software Testing; U.S. Appl. No. 13/048,305, filed Mar. 15, 2011.

Randall R. Cook; Dynamic Insertion and Removal of Virtual Software Sub-Layers; U.S. Appl. No. 13/551,576, filed Jul. 17, 2012.

FireEye, Inc.; http://www.fireeye.com/, as accessed Mar. 18, 2014; Oct. 12, 1999.

Palo Alto Networks; https://www.paloaltonetworks.com/, as accessed Mar. 18, 2014; Oct. 18, 2000.

Registry Virtualization; http://msdn.microsoft.com/en-us/library/aa965884%28v=vs.85%29.aspx, as accessed Mar. 13, 2011; Mar. 23, 2010.

Search Server Virtualization, Virtualized test and development environments; http://searchservervirtualization. techtargetcom/resources/Virtualized-test-and-development-environments, as accessed May 31, 2012; 19 Jan. 19, 2011.

Rajeev Nagar; Windows NT File System Internals—A Developer's Guide; Sep. 1997; Chapter 4, pp. 1-58.

International Business Machines Corporation; Method for permitting several versions of a module to coexist within a virtual machine; Research Disclosure, Mason Publications; Mar. 1, 2001; vol. 443, No. 177; Mason Publications; Hampshire, GB.

* cited by examiner

| Profiles 500 | | |
|---|---|---|
| Computing Systems 202 | Applications 208 | Virtual Containers 212 |
| 1 | 1<br>2<br>4 | A<br>B<br>D |
| 2 | 1<br>3<br>4<br>6 | A<br>C<br>E<br>F |
| 3 | 2<br>3<br>4<br>5 | B<br>C<br>D<br>E |
| 4 | 1<br>2<br>5 | A<br>B<br>E |

*FIG. 5*

SYSTEMS AND METHODS FOR REPLICATING COMPUTING SYSTEM ENVIRONMENTS

BACKGROUND

Targeted malware attacks are typically less widespread than other types of malware attacks and may therefore be more difficult to identify. Traditional signature-based malware detection may not be effective at catching targeted malware attacks before such attacks perform malicious actions. As a result, some malware detection systems may intercept and perform behavioral analysis on potentially malicious files before such files are received and/or opened on their intended destinations.

To determine whether a potentially malicious file is in fact malicious, a malware detection system may attempt to determine how the file would affect a target endpoint before the file is used on the endpoint. For example, a malware detection system may send the potentially malicious file to a sandbox environment and may monitor how the potentially malicious file affects the sandbox environment. Unfortunately, sandbox environments may often be configured differently than target endpoints. If a malicious file attacks a vulnerability that is in the targeted endpoint but not the sandbox environment, the file may not be identified as malicious within the sandbox environment. To address this issue, some malware detection systems may attempt to provide numerous sandbox environments that correspond to different endpoint configurations. However, maintaining numerous sandbox environments may be costly and may still fail to sufficiently replicate each distinct endpoint configuration. Furthermore, maintaining numerous sandbox environments may involve significant cost and effort. As such, the current disclosure identifies and addresses a need for more efficient and effective systems and methods for replicating computing system environments.

SUMMARY

As will be described in greater detail below, the instant disclosure describes various systems and methods for replicating the configuration of a particular computing system by activating each virtual container within a virtual machine image that stores an application installed on the computing system. The virtual machine, once configured to replicate the computing system, may be used to determine how a file may affect the computing system.

In one example, a computer-implemented method for replicating computing system environments may include (1) identifying each application installed on a plurality of computing systems, (2) creating, within a virtual machine image, virtual containers that store each application installed on the plurality of computing systems, (3) determining that a potentially malicious file is directed to a target computing system within the plurality of computing systems, (4) identifying each application installed on the target computing system, (5) in response to determining that the file is directed to the target computing system, replicating a configuration of the target computing system within the virtual machine image by, for each application installed on the target computing system, activating a virtual container that stores the application, and (6) after configuring the virtual machine image to replicate the configuration of the target computing system, determining how the file would affect the target computing system by sending the file to the virtual machine image and analyzing how the file impacts the virtual machine image.

In some examples, identifying each application installed on the plurality of computing systems may include identifying each application at a server that hosts the virtual machine and is remote from each computing system in the plurality of computing systems. Additionally or alternatively, identifying each application installed on the plurality of computing systems may include deploying, to each computing system in the plurality of computing systems, a software agent that identifies each application on the computing system and sends information identifying each application to the server that hosts the virtual machine image.

In some embodiments, identifying each application installed on the plurality of computing systems may include identifying a version of each application. In such embodiments, replicating the configuration of the target computing system may include, for each application installed on the target computing system, activating the virtual container that stores the version of the application.

In some examples, identifying each application installed on the plurality of computing systems may include, for each of the plurality of computing systems, creating a profile for the computing system that identifies each application installed on the computing system. In these examples, identifying each application installed on the target computing system may include identifying the profile for the target computing system.

Additionally, in some embodiments, creating the profile for the computing system may further include, for each application installed on the computing system, mapping the application to a virtual container that contains the application. In these embodiments, replicating the configuration of the target computing system may include activating each virtual container mapped to each application installed on the target computing system.

Furthermore, in some examples the method may include updating the profile of at least one computing system in response to determining that the computing system was modified when at least one application on the computing system was updated to a new version, deleted from the computing system, or newly installed on the computing system. In these examples, updating the profile of the computing system may include sending information about the modification from the computing system to a server that hosts the virtual machine image.

In some embodiments, determining that the file is directed to the target computing system may include intercepting the file prior to the file being used on the target computing system. Additionally, in some examples, analyzing how the file impacts the virtual machine image may include identifying suspicious activity on the virtual machine image after the file is sent to the virtual machine image.

In one embodiment, a system for implementing the above-described method may include (1) an identification module that identifies each application installed on a plurality of computing systems, (2) a creation module that creates, within a virtual machine image, virtual containers that store each application installed on the plurality of computing systems, (3) a determination module that determines that a potentially malicious file is directed to a target computing system within the plurality of computing systems, (4) an application module that identifies each application installed on the target computing system, (5) a replication module that, in response to determining that the file is directed to the target computing system, replicates a configuration of the target computing system within the virtual machine image by, for each application installed on the target computing system, activating a virtual container that stores the application, and (6) an analysis module that, after configuring the virtual machine image to replicate the configuration of the target computing system, determines how the file would affect the target computing system by sending the file to the virtual machine image and analyzing how the file impacts the virtual machine image. In addition, the system may include at least one processor configured to execute the identification module, the creation module, the determination module, the application module, the replication module, and the analysis module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify each application installed on a plurality of computing systems, (2) create, within a virtual machine image, virtual containers that store each application installed on the plurality of computing systems, (3) determine that a potentially malicious file is directed to a target computing system within the plurality of computing systems, (4) identify each application installed on the target computing system, (5) in response to determining that the file is directed to the target computing system, replicate a configuration of the target computing system within the virtual machine image by, for each application installed on the target computing system, activating a virtual container that stores the application, and (6) after configuring the virtual machine image to replicate the configuration of the target computing system, determine how the file would affect the target computing system by sending the file to the virtual machine image and analyzing how the file impacts the virtual machine image.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of exemplary profiles for computing systems.

Figure 1:
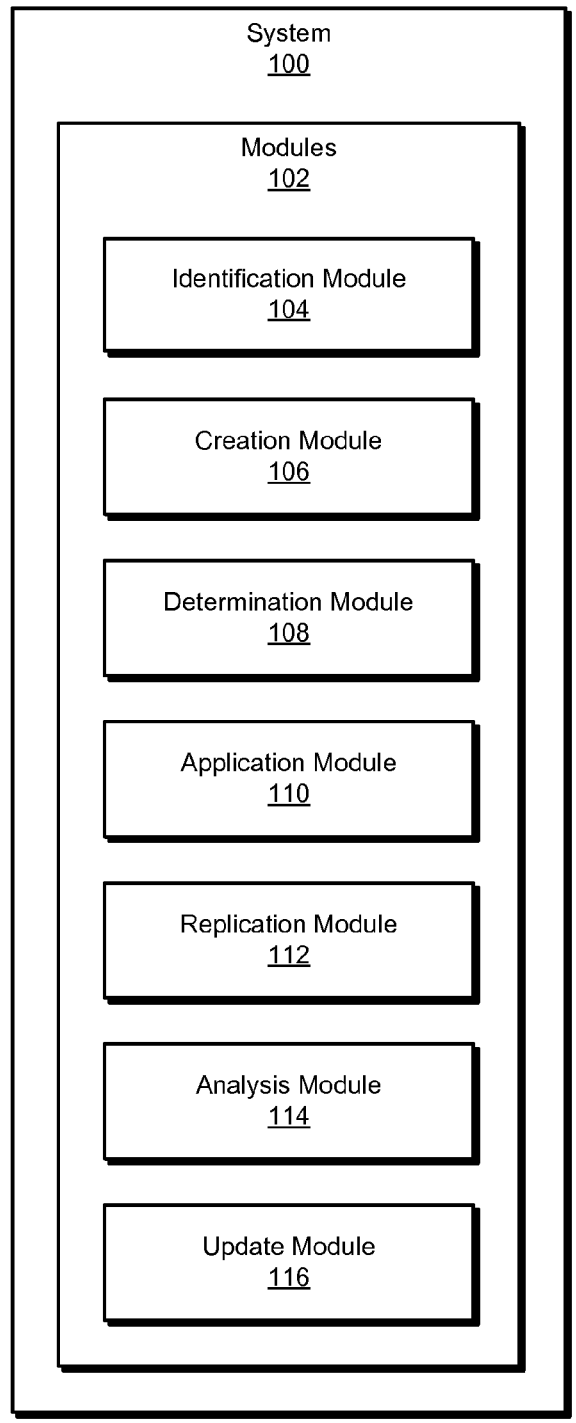
FIG. 1 is a block diagram of an exemplary system for replicating computing system environments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for replicating computing system environments. As will be explained in greater detail below, by identifying each of the applications installed on a plurality of computing systems and associating them with virtual containers on a virtual machine, the systems and methods described herein may facilitate replication of the configuration of any of the plurality of computing systems on the virtual machine. In addition, by creating a single, configurable virtual machine image, rather than distinct images for each of the plurality of computing systems, the disclosed systems and methods may greatly reduce the storage and computing resources required to maintain and execute test environments. Furthermore, by replicating the configuration of a computing system that is the target of a malware attack, the systems and methods described herein may determine whether a potentially malicious file would exploit a vulnerability of the computing system or otherwise adversely affect the computing system.

The following will provide, with reference to FIGS. 1-2 and 4-6, detailed descriptions of exemplary systems for replicating computing system environments. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for replicating computing system environments. As illustrated in this figure, exemplary system 100 may include one or more modules 102 for performing one or more tasks. For example, and as will be explained in greater detail below, exemplary system 100 may include an identification module 104 that identifies each application installed on a plurality of computing systems. Exemplary system 100 may also include a creation module 106 that creates, within a virtual machine image, virtual containers that store each application installed on the plurality of computing systems.

In addition, and as will be described in greater detail below, exemplary system 100 may include a determination module 108 that determines that a potentially malicious file is directed to a target computing system within the plurality of computing systems. Furthermore, exemplary system 100 may include an application module 110 that identifies each application installed on the target computing system. In some examples, exemplary system 100 may also include a replication module 112 that, in response to determining that the file is directed to the target computing system, replicates a configuration of the target computing system within the virtual machine image by, for each application installed on the target computing system, activating a virtual container that stores the application.

Furthermore, exemplary system 100 may include an analysis module 114 that, after configuring the virtual machine image to replicate the configuration of the target computing system, determines how the file would affect the target computing system by sending the file to the virtual machine image and analyzing how the file impacts the virtual machine image. Finally, exemplary system 100 may include an update module 116 that updates the profile of at least one computing system in response to determining that at least one application installed on the computing system was modified. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing systems 202(1)-(N)) and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Figure 2:
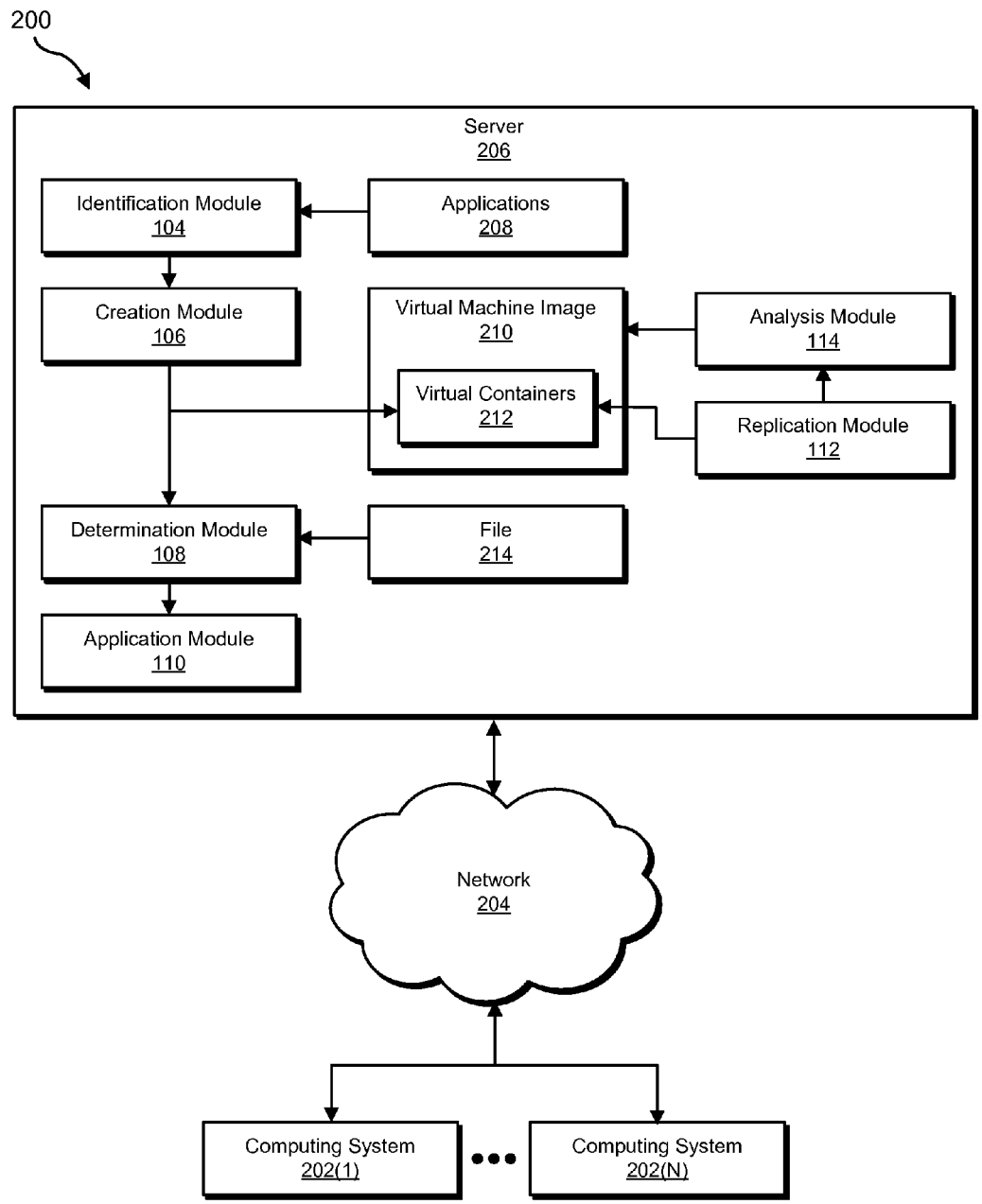
FIG. 2 is a block diagram of an additional exemplary system for replicating computing system environments.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing systems 202(1)-(N) in communication with a server 206 via a network 204. In one example, server 206 may be programmed with one or more of modules 102. In this way, server 206 may analyze potentially malicious files distributed to any of computing systems 202(1)-(N). Additionally or alternatively, one or more of computing systems 202(1)-(N) may be programmed with one or more of modules 102 to facilitate the identification of applications and detection of malware on computing systems 202(1)-(N).

In one embodiment, one or more of modules 102 from FIG. 1 may, when executed by at least one processor of one of computing systems 202(1)-(N) and/or server 206, enable computing systems 202(1)-(N) and/or server 206 to replicate computing system environments. For example, and as will be described in greater detail below, identification module 104 may cause computing systems 202(1)-(N) and/or server 206 to identify each application (e.g., applications 208) installed on a plurality of computing systems (e.g., computing systems 202(1)-(N)). Next, creation module 106 may cause computing systems 202(1)-(N) and/or server 206 to create, within a virtual machine image (e.g., virtual machine image 210) virtual containers (e.g., virtual containers 212) that store each application installed on computing systems 202(1)-(N). Determination module 108 may then cause one or more of computing systems 202(1)-(N) and/or server 206 to determine that a potentially malicious file (e.g., file 214) is directed to a target computing system (e.g., target computing system 202(1)). In addition, application module 110 may cause computing systems 202(1)-(N) and/or server 206 to identify each application installed on target computing system 202(1).

In response to determining that the potentially malicious file is directed to target computing system 202(1), replication module 112 may cause target computing system 202(1) and/or server 206 to replicate a configuration of target computing system 202(1) within virtual machine image 210 by, for each application installed on target computing system 202(1), activating a virtual container that stores the application. Finally, after configuring virtual machine image 210 to replicate the configuration of target computing system 202(1), analysis module 114 may cause target computing system 202(1) and/or server 206 to determine how the file would affect target computing system 202(1) by sending file 214 to virtual machine image 210 and analyzing how file 214 impacts virtual machine image 210.

Computing systems 202(1)-(N) generally represent any type or form of computing device capable of reading computer-executable instructions. Examples of computing systems 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device.

Server 206 generally represents any type or form of computing device that is capable of creating a configurable virtual machine image, replicating a computing system configuration on the virtual machine image, and/or analyzing files on the virtual machine image. In some examples, server 206 may be partially or solely dedicated to configuring virtual machine image 210 in order to analyze potentially malicious files directed to one or more of computing systems 202(1)-(N). Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing systems 202(1)-(N) and server 206.

Figure 3:
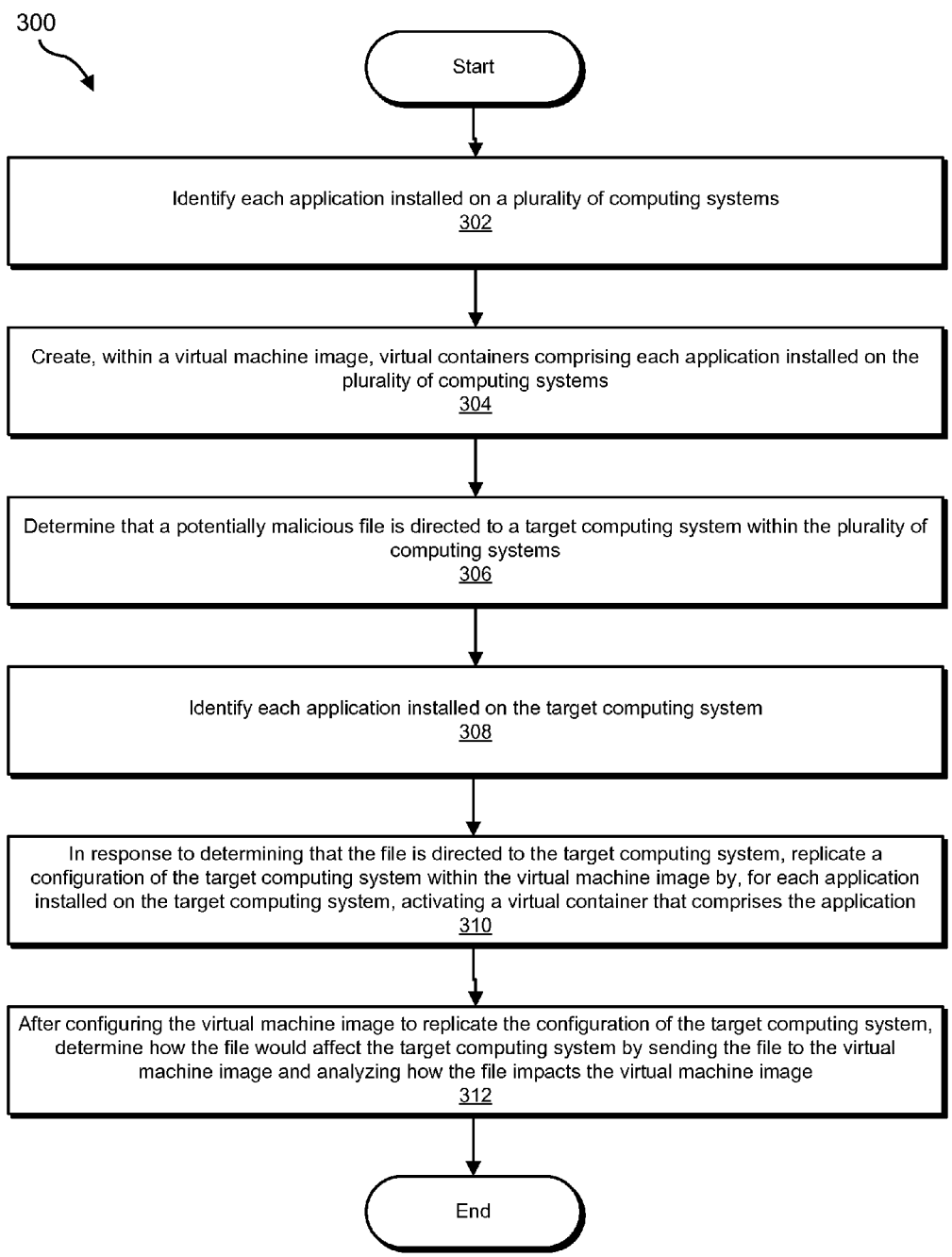
FIG. 3 is a flow diagram of an exemplary method for replicating computing system environments.

FIG. 3 is a flow diagram of an exemplary computer-implemented method 300 for replicating computing system environments. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify each application installed on a plurality of computing systems. For example, identification module 104 may, as part of server 206 in FIG. 2, identify applications 208. In some examples, applications 208 may be installed on one or more of computing systems 202(1)-(N).

The term "application," as used herein, generally refers to any type or form of software, file, or executable code that may be installed, run, deployed, or otherwise implemented on a computing system. Examples of applications include, without limitation, operating systems, web browsers, office software suites (e.g., word processing applications, spreadsheet applications, presentation applications, etc.), gaming applications, security applications, and media applications. In some examples, an application may be any portion of software that a malicious file may corrupt and/or utilize to perform harmful or undesirable behaviors.

The systems described herein may identify each application installed on the plurality of computing systems in a variety of ways. In some examples, identification module 104 may identify each of applications 208 remotely from a server (e.g., server 206 in FIG. 2) that hosts virtual machine image 210. For example, identification module 104, implemented on the remote server, may query and/or scan the registry of one or more of the plurality of computing systems to identify each application installed on the computing systems.

In some examples, the plurality of computing systems may be connected via a single, local network (e.g., network 204 in FIG. 2). In these examples, identification module 104 may execute one or more instructions via the network (e.g., by executing a Windows Management Instrumentation (WMI) script) in order to discover all installed and/or deployed applications on the plurality of computing systems. The plurality of computing systems may also be connected via a wide area network and/or any other suitable networking environment.

Additionally or alternatively, identification module 104 may identify each installed application by deploying, to each computing system in the plurality of computing systems, a software agent that identifies each application on the computing system and sends information identifying each application to the server that hosts the virtual machine image. For example, a user or administrator of each of the plurality of computing systems may install all or a portion of identification module 104 on each computing system as part of a threat protection software package. Instances of identification module 104 on each computing system may then periodically and/or in response to a request from the server, send information identifying each installed application to the server.

Identification module 104 may request, discover, and/or receive any information sufficient to uniquely identify each application installed on the plurality of computing systems. In some examples, identification module 104 may uniquely identify one or more applications by identifying the version of the application and/or any additional relevant information about the application. As an example, if identification module 104 determines that MICROSOFT OFFICE was installed on a computing system, identification module 104 may also determine which MICROSOFT OFFICE version (e.g., MICROSOFT OFFICE XP, MICROSOFT OFFICE 2007, a 32 bit version, a 64 bit version, etc.) was installed. In another example, if identification module 104 determines that GOOGLE CHROME was installed on a computing system, identification module 104 may also determine which version of GOOGLE CHROME (e.g., version 33, version 34, etc.) was installed, as well as the operating system (e.g., WINDOWS, iOS, etc.) for which the version of GOOGLE CHROME was designed. In general, identification module 104 may identify any version, update, or form of an application that may result in different behaviors when interacting with malware.

In addition, in some examples identification module 104 may create an application profile for each of the plurality of computing systems. For example, for each of the computing systems, identification module 104 may identify and store information identifying each application installed on the computing system. As will be explained in greater detail below, creating a profile for each computing system may enable the disclosed systems to replicate each computing system in virtual machine image 210 as needed.

In order to accurately detect malware threats directed to the plurality of computing systems, identification module 104 may continue to dynamically update the application profiles of one or more computing systems. For example, identification module 104 may periodically check (e.g., by scanning the registries of the plurality of computing systems) to determine whether the configuration of one or more computing systems has been modified. Additionally or alternatively, identification module 104 may install a trigger within the computing systems that detects a modification to a configuration. Identification module 104 may determine that at least one application installed on a computing system was modified by detecting that the application was updated to a new version, detecting that the application was deleted from the computing system, detecting that the application was newly installed on the computing system, and/or by detecting any other type of modification. In response to determining that at least one application installed on the computing system was modified, update module 116 may update the profile of the computing system to reflect the modification.

Returning to FIG. 3, at step 304 one or more of the systems described herein may create, within a virtual machine image, virtual containers that store each application installed on the plurality of computing systems. For example, creation module 106 may, as part of server 206 in FIG. 2, create virtual containers 212 within virtual machine image 210.

The phrase "container," as used herein, generally refers to any type or form of software-defined layer, partition, or grouping that separates one or more applications and/or information associated with the applications from the remaining applications stored within a file system. As such, the contents of a container are organized in a single layer that may be presented, withdrawn, moved, or deleted as a unit. In some examples, a container that stores an application may include the file objects and/or registry entries of the application. In addition, a container may store software add-ons to an operating system and/or operating system settings.

In an ordinary file system, an operating system applies a file pathname to a file system to reach a file object, which might exist, for example, as a series of data blocks on a hard disk. Some operating systems permit access to a plurality of file systems, each existing in a confined name space. For example, in a MICROSOFT WINDOWS environment, a file name is preceded by a drive letter (e.g., "C:"). A LINUX operating system also utilizes prefixed directories; some LINUX distributions provide for file systems to be mounted under the "/mnt" namespace. In any case, such an operating system can determine the single location of access for a file by an evaluation of file pathname by extracting and examining the relevant portion thereof. A system that supports file system layering (e.g., that supports the creation of containers) can provide for more than one location of access for a particular file pathname. Such a layered operating system can therefore look in two or more repositories or containers of file objects for the same file or set of files.

Containers may be activated to enable access to their contents or deactivated to disable access to their contents. An enabled or activated container (i.e., a container that is enabled for access by a base operating system) may overlay its contents over a base file system and/or base registry, and thus the container contents may appear to the operating system as though they are part of the base file system and/or registry. In other words, when a container is activated, file system calls may be redirected to the container. If a container is deactivated or removed, the container contents may no longer appear to the processes of the operating system. As such, containers provide a convenient way to deposit or remove files from a computer as a higher-order unit.

In addition, the phrase "virtual machine," as used herein, generally refers to any type or form of software-based emulation of a computing system. A virtual machine may be implemented by any collection of files or executable code that replicate the architecture and functionality of a physical computing device. In addition, a virtual machine may share the resources of a computing device that "hosts" the virtual machine and the virtual machine may be controlled and/or managed by the host operating system. However, from the perspective of a file running in the virtual machine, the execution environment created within the virtual machine may appear as indistinguishable from that of a physical computing device. In some examples, a virtual machine may include one or more virtual containers.

Furthermore, the term "image," as used herein, generally refers to any type or form of copy or replication of the state or configuration of a computing system. For example, an image may represent the complete configuration of a computing device at one point in time, including the operating system, stored files, settings, and any additional applications installed on the computing device.

The systems and methods described herein may create virtual containers that store each application installed on the plurality of computing systems in a variety of ways. In some examples, creation module 106 may first obtain copies or instances of each of applications 208. Creation module 106 may obtain the copies at any point during or after identification module 104 identifies applications 208. For example, when sending information that identifies applications 208 to the server that hosts virtual machine image 210, identification module 104 may also send copies of applications 208. Additionally or alternatively, identification module 104 may search the Internet for applications 208, identify applications 208 within a database of applications, and/or obtain applications 208 in any suitable manner.

In some examples, identification module 104 may obtain a copy of each application installed on a computing system (e.g., by obtaining a virtual image of the computing system). Alternatively, identification module 104 may only obtain copies of individual applications (e.g., by sending/receiving the applications in separate virtual containers). For example, identification module 104 may obtain copies of individual applications if creation module 106 has already obtained copies of the other applications installed on a computing system. In addition, in some examples, identification module 104 may only obtain copies of applications that are critical to the functionality of a computing system and/or that may be susceptible to an attack. Notably, while replicating the exact configuration (i.e., every installed application) of a computing system may most effectively enable the disclosed systems to identify malware threats, in some examples, one or more of modules 102 may conserve computing resources and/or network bandwidth by only replicating critical applications and/or settings.

Once creation module 106 has obtained a copy of an application, creation module 106 may store the application in a virtual container within virtual machine image 210. An application stored within a virtual container may exactly replicate the functionality of the application installed on the source computing system, but may not be accessible by applications within other virtual containers unless activated. Creation module 106 may repeat the storing process for each installed application until every application is represented once within virtual machine image 210. In some examples, creation module 106 may store each application in a separate container (i.e., one application per virtual container). However, in some examples, creation module 106 may store one or more applications (e.g., combinations of applications that are frequently installed together on the same computing system) in one virtual container.

In some embodiments, two or more identified applications may be incompatible if installed side-by-side (i.e., on the same computing system). For example, a computing system may be unable to host two versions of a web browser. As another example, a computing system may be unable to host two different operating systems without partitioning them. Therefore, creation module 106 may store incompatible applications in separate virtual containers such that they may be activated at different times and not interrupt or prevent execution of virtual machine image 210. In some examples, creation module 106 may store incompatible applications by implementing one or more application virtualization technologies, such as SYMANTEC WORKSPACE VIRTUALIZATION or FSLOGIX APPS.

Figure 4:
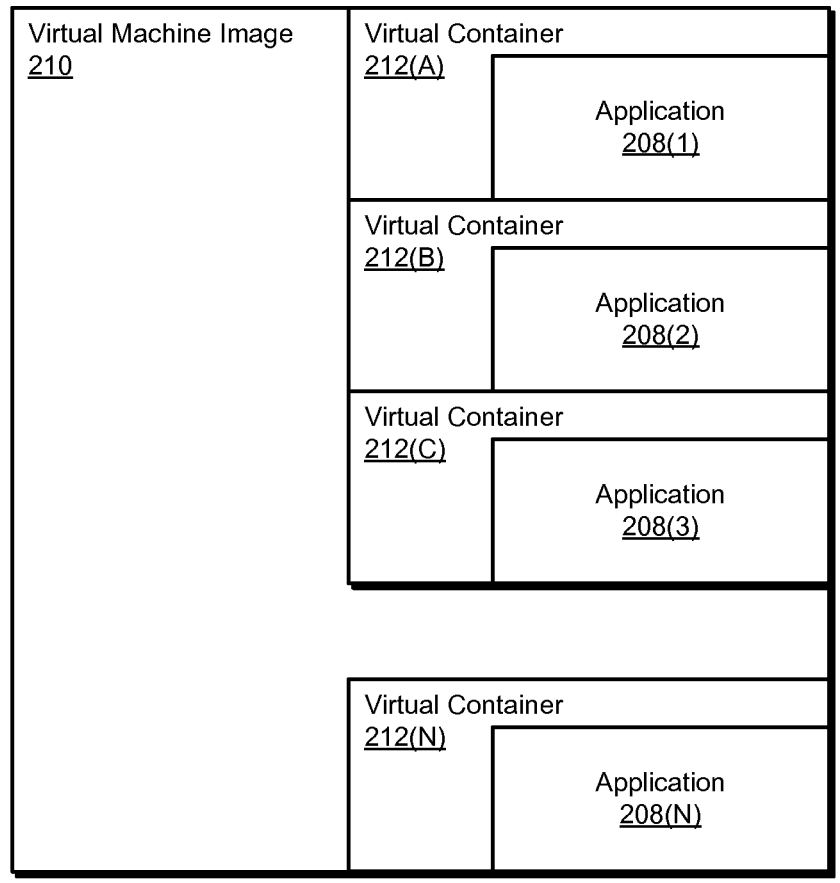
FIG. 4 is an illustration of an exemplary virtual machine image.

As an example, FIG. 4 illustrates virtual containers 212 (A)-(N) stored within virtual machine image 210. As shown in FIG. 4, each of virtual containers 212(A)-(N) contains one of applications 208(1)-(N). In this example, applications 208 (1)-(N) may represent every unique application installed on computing systems 202(1)-(N). As such, virtual machine image 210 may contain every combination of applications necessary to replicate the configurations of each of computing systems 202(1)-(N).

As discussed above, identification module 104 may create a profile for each of the plurality of computing systems by identifying and recording each application installed on each computing system. In some examples, creation module 106 may further develop one or more application profiles by, for each application within the profile, mapping the application to a virtual container that stores the application. For example, creation module 106 may identify which virtual container stores each application installed on a particular computing system and then associate each virtual container with each application and/or the computing system.

Also as discussed above, in some examples, update module 116 may update the profile of at least one computing system in response to determining that one or more applications installed on the computing system has been modified. In addition to updating the profile with the name, version, etc. of the modified application, update module 116 may update the profile with a new association between the computing system and a virtual container that stores the modified application. In some examples, the modified application may represent an application or application version previously unidentified by identification module 104. In these examples, update module 116 may update the profile by obtaining a copy of the modified application. Specifically, update module 116 may obtain a copy of a modified application by receiving, from the computing system, a copy of just the modified application (e.g., in a virtual container). In this way, update module 116 may efficiently update one or more application profiles without having to transmit an entire virtual image of the modified computing system.

As an example, FIG. 5 illustrates exemplary profiles 500. Specifically, FIG. 5 illustrates exemplary profiles for computing systems 202(1)-(4). In this example, identification module 104 may have identified six unique applications (i.e., applications 208(1)-(6)) that are installed across computing systems 202(1)-(4). As shown in FIG. 5, the configuration of each of computing systems 202(1)-(4) may include of combinations of applications 208(1)-(6). Also as shown in FIG. 5, each application may be mapped to a virtual container within virtual containers 212. In this example, application 208(1) may be stored in virtual container 212(A), application 208(2) may be stored in virtual container 212(B), etc. As will be discussed in greater detail below, creating application profiles such as the ones illustrated in FIG. 5 may enable one or more of modules 102 to replicate the configuration of a particular computing system.

Returning to FIG. 3, at step 306 one or more of the systems described herein may determine that a potentially malicious file is directed to a target computing system within the plurality of computing systems. For example, determination module 108 may, as part of server 206 in FIG. 2, determine that file 214 is directed to target computing system 202(1).

The term "file," as used herein, generally refers to any type or form of data, software, or other executable code that may be downloaded to, executed by, installed on, and/or utilized by one or more applications installed on a computing system. Examples of files include, without limitation, executable files, data files, application files, program files, configuration files, and directory files. In addition, files may be distributed to a computing system via electronic messages (e.g., emails and email attachments), downloaded via a network, transferred from a server or storage device, and/or accessed by a computing system in any other way. Potentially malicious files may be files that are part of targeted threats (e.g., threats delivered via zero day attack vulnerability exploits, phising messages, SMTP emails, port attacks, etc.).

The systems described herein may determine that the file is directed to the target computing system in a variety of ways. In some examples, determination module 108 may determine that file 214 is directed to target computing system 202(1) after file 214 has been executed, installed, or otherwise implemented on target computing system 202(1). For example, determination module 108 may identify file 214 as part of a malware scanning system that analyzes files installed on computing system 216. However, in other examples, determination module 108 may most effectively protect target computing system 202(1) from the threats posed by file 214 by determining that file 214 is directed to target computing system 202(1) before file 214 reaches, is installed on, or is executed on target computing system 202(1). For example, determination module 108 may intercept file 214 as file 214 is routed to target computing system 202(1) via network 204. In addition, determination module 108 may identify file 214 once file 214 has arrived at target computing 216 but before file 214 is used (e.g., opened or executed) on target computing system 202(1). For example, determination module 108 may identify file 214 when a user of target computing system 202(1) attempts to download file 214 or when target computing system 202(1) receives file 214 in a message (e.g., as an email or email attachment).

In some examples determination module 108 may evaluate every file directed to target computing system 202(1) as a potentially malicious file. In such embodiments, determination module 108 may direct one or more of modules 102 to perform an analysis on every file. However, in other embodiments, once determination module 108 has determined that file 214 is directed to computing system 216, determination module 108 may determine whether file 214 is potentially malicious before directing one or more of modules 102 to analyze file 214. For example, determination module 108 may label file 214 as potentially malicious if file 214 was distributed from an unknown source or a source known to distribute malware, if file 214 contains suspicious content, or if file 214 is suspicious for any other reason. Notably, at this point determination module 108 may not determine whether file 214 is actually malicious; rather, determination module 108 may simply narrow the pool of files directed to computing system 216 by identifying files that might be malicious.

Furthermore, in some examples determination module 108 may prevent file 214 from reaching or being opened on target computing system 202(1) in response to identifying file 214 as a potentially malicious file. For example, determination module 108 may quarantine file 214 (e.g., may prevent any applications installed on target computing system 202(1) and/or a user of target computing system 202(1) from accessing file 214) until one or more of modules 102 have analyzed file 214 and determined that file 214 will not negatively affect target computing system 202(1).

Returning to FIG. 3, at step 308 one or more of the systems described herein may identify each application installed on the target computing system. For example, application module 110 may, as part of server 206 in FIG. 2, identify each application installed on target computing system 202(1).

The systems described herein may identify each application installed on the target computing system in a variety of ways. In some examples, if identification module 104 created an application profile for one or more computing systems, application module 110 may simply search a database of profiles for a profile that corresponds to target computing system 202(1) and identify each application listed in the profile. In some examples, if identification module 104 did not previously create an application profile for target computing system 202(1), application module 110 may direct identification module 104 to identify, either remotely or via a deployed software agent as described above, each application installed on target computing system 202(1).

In some embodiments, application module 110 may additionally identify each virtual container that stores an application installed on target computing system 202(1). Similar to identifying each application installed on target computing system 202(1), application module 110 may identify each virtual container mapped to target computing system 202(1) within an application profile of target computing system 202 (1). In addition, if application module 110 determines that one or more applications installed on target computing system 202(1) are not currently stored within any of virtual containers 212, application module 110 may direct creation module 106 to create additional virtual containers that store the missing applications.

Returning to FIG. 3, at step 310 one or more of the systems described herein may, in response to determining that the file is directed to the target computing system, replicate the configuration of the target computing system within the virtual machine image by, for each application installed on the target computing system, activating a virtual container that stores the application. For example, replication module 112 may, as part of server 206 in FIG. 2, replicate the configuration of target computing system 202(1) by, for each application installed on target computing system 202(1), activating a virtual container that stores the application.

The systems described herein may activate each virtual container that stores an application installed on the target computing system in a variety of ways. In some examples, replication module 112 may activate each virtual container identified by application module 110 and deactivate all remaining virtual containers within virtual machine image 210. For example, if creation module 106 mapped each application within a profile associated with target computing system 202(1) to a virtual container within virtual machine image 210, replication module 112 may activate only the mapped virtual containers. In addition, if identification module 104 identified particular versions of applications installed on computing system 216, replication module 112 may activate virtual containers that store the particular application versions.

As explained previously, activating a virtual container within virtual machine image 210 may make the contents of the virtual container visible to an operating system controlling virtual machine image 210. Conversely, deactivating a virtual container may hide the contents of the virtual container to the operating system. As such, by only activating the virtual containers that store applications installed on target computing system 202(1), the virtual execution environment of virtual machine image 210 may function congruously to the execution environment of target computing system 202(1).

Figure 6:
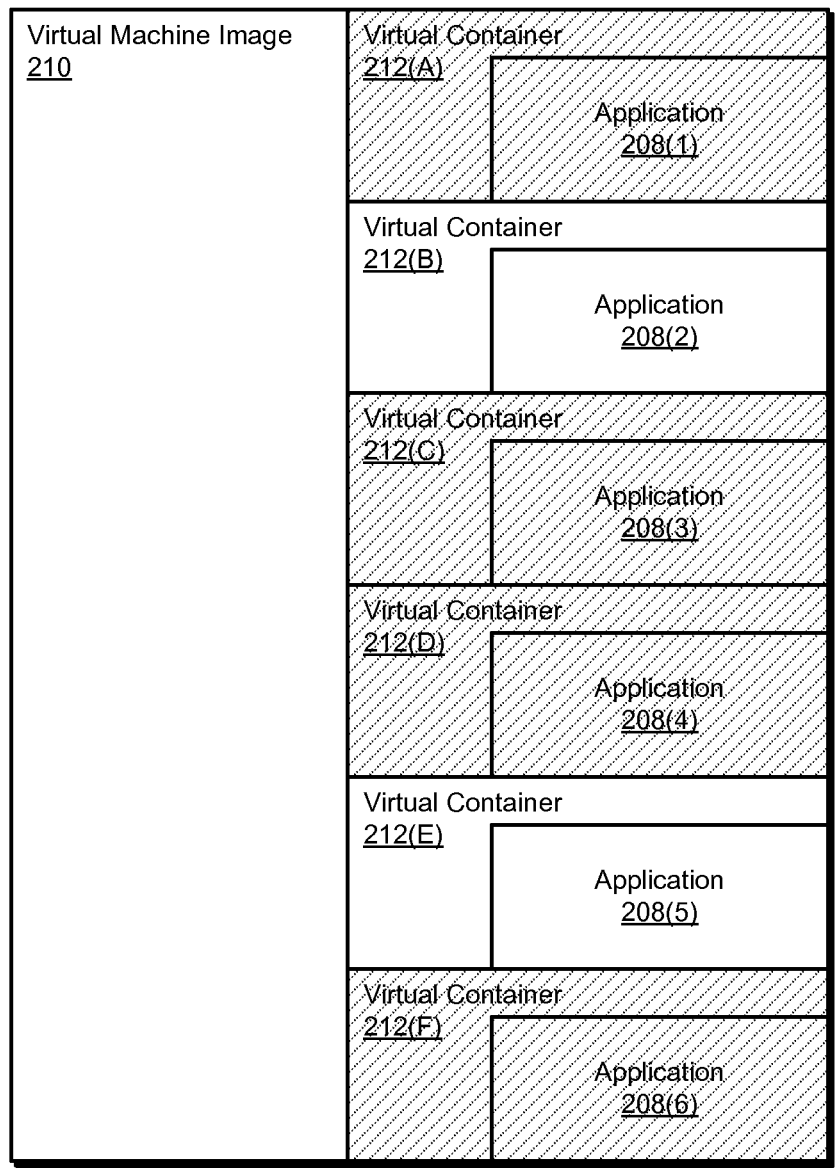
FIG. 6 is an illustration of an exemplary virtual machine image configured to replicate the configuration of a target computing system.

As an example, FIG. 6 illustrates the configuration of a target computing system replicated within virtual machine image 210. Specifically, FIG. 6 illustrates the replication of the configuration of computing system 202(2) as shown in FIG. 5. As such, FIG. 6 indicates (via shaded boxes) that virtual containers 212(A), 212(C), 212(D), and 212(F), storing applications 208(1), 208(3), 208(4), and 208(6), respectively, have been activated. The remaining virtual containers (i.e., virtual container 212(B) and 2121(E), storing applications 208(2) and 208(5)), have not been activate and/or have been deactivated.

Returning to FIG. 3, at step 312 one or more of the systems described herein may, after configuring the virtual machine image to replicate the configuration of the target computing system, determine how the file would affect the target computing system by sending the file to the virtual machine image and analyzing how the file impacts the virtual machine image. For example, analysis module 114 may, as part of server 206 in FIG. 2, send file 214 to virtual machine image 210 and analyze how file 214 impacts virtual machine image 210.

The systems described herein may send the file to the virtual machine image for analysis in a variety of contexts. In some examples, analysis module 114 may send file 214 to virtual machine image 210 at any point after determination module 108 determines that file 214 is a potentially malicious file directed to target computing system 202(1). Notably, analysis module 114 may send file 214 to virtual machine image 210 before file 214 runs, executes, or is otherwise opened or used on target computing system 202(1).

Once analysis module 114 sends file 214 to virtual machine 210 and once replication module 112 replicates the configuration of target computing system 202(1) on virtual machine 210, analysis module 114 may analyze how file 214 impacts virtual machine image 210. For example, analysis module 114 may allow each activated virtual container to access and/or interact with file 214 (e.g., by storing file 214 in an activated virtual container). Additionally or alternatively, analysis module 114 may prompt one or more applications stored within activated virtual containers to interact with file 214. For example, analysis module 114 may prompt one or more activated applications to download and/or install file 214 onto virtual machine image 210. Analysis module 114 may then execute file 214 and/or one or more applications associated with file 214 such that file 214 demonstrates activity on virtual machine image 210. Additionally or alternatively, analysis module 114 may simulate a user interacting with file 214 on virtual machine image 210 in order to determine the intended behavior of file 214.

In some examples, analysis module 114 may determine how file 214 impacts virtual machine 210 by identifying suspicious activity on virtual machine image 210. For example, analysis module 114 may detect that, when implemented on virtual machine image 210, file 214 attempts to log the activity of certain applications and/or users of virtual machine image 210, install additional applications onto virtual machine image 210, corrupt and/or alter certain instructions, applications, registries, settings, or memory structures within virtual machine image 210, turn off existing malware protections within virtual machine image 210, and/or perform any additional unexpected or malicious actions. In addition, analysis module 114 may determine that implementing file 214 on virtual machine image 210 results in undesirable side effects or incompatibilities with one or more activated applications or that executing file 214 causes virtual machine image 210 to crash or otherwise negatively impacts the execution of virtual machine image 210.

In general, analysis module 114 may identify suspicious activity on virtual machine image 210 using any of a variety of malware detection techniques. Notably, by implementing file 214 in a virtual execution environment, analysis module 114 may determine whether file 214 represents malicious software by simply analyzing the behavior of file 214 on virtual machine image 210 without exposing target computing system 210(1) to any risk. Identifying suspicious behavior on virtual machine image 210 may be sufficient to clearly and directly indicate whether file 214 represents a threat to the specific configuration of target computing system 202(1).

In some examples, if analysis module 114 detects suspicious activity that resulted from implementing file 214 on virtual machine image 210, analysis module 114 may then determine that file 214 represents malicious software. If analysis module 114 determines that file 214 represents malicious software, analysis module 114 may block file 214 from being sent to or used on target computing system 202(1) and/or may alert a user of target computing system 202(1) that file 214 may represent malicious software. However, in other examples, if analysis module 114 does not detect any suspicious activity on virtual machine image 210 as a result of implementing file 214, analysis module 114 may allow file 214 to be used normally on target computing system 202(1) and/or may notify a user of target computing system 202(1) that file 214 does not represent malicious software.

The systems and methods disclosed herein may be implemented in a variety of ways and provide a number of advantages. For example, by storing each application installed on a plurality of computing systems within virtual containers, the disclosed systems and methods may create a configurable virtual machine image that is capable of replicating the configuration of any of the plurality of computing systems. In addition, by intercepting potentially malicious files directed to a target computing system, the described systems and methods may determine exactly how the file would impact the target computing system before allowing the file to execute on the target computing system. As such, the systems and methods described herein may efficiently and effectively identify targeted malware attacks and various other types of malware attacks.

Figure 7:
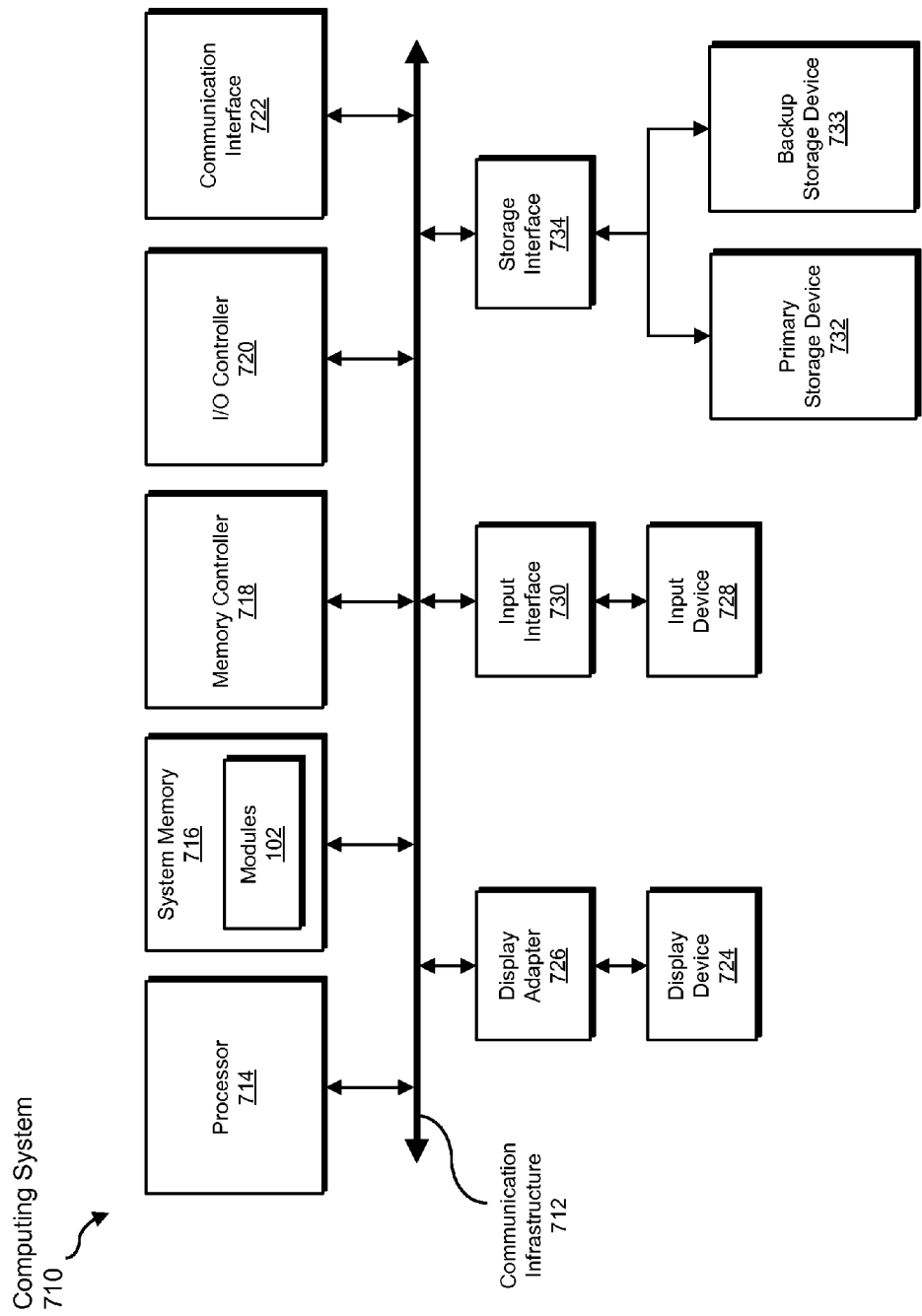
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
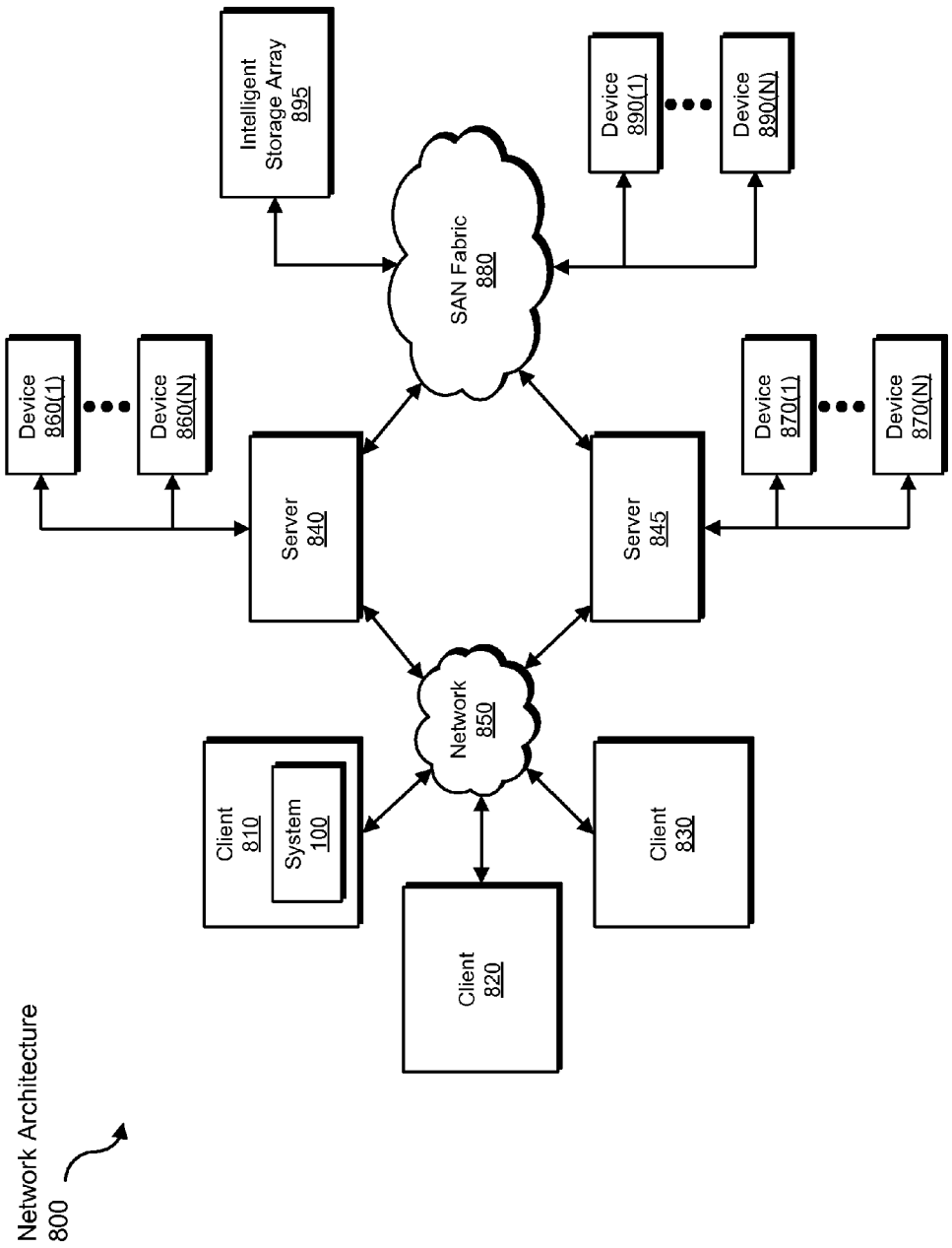
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for replicating computing system environments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive applications installed on a plurality of computing systems, transform the applications, store the transformed applications in a virtual machine image, and use the transformed applications to replicate the configuration of a computing system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for replicating computing system environments, at least a portion of the method being performed by a computing device comprising at least one processor, the method comprising:
   identifying each application installed on a plurality of computing systems and creating a profile for each computing system that identifies each application installed on the computing system;
   creating, within a virtual machine image, virtual containers comprising each application installed on the plurality of computing systems;
   determining that a potentially malicious file is directed to a target computing system within the plurality of computing systems;
   utilizing a profile for the target computing system to identify each application installed on the target computing system;
   in response to determining that the file is directed to the target computing system, replicating a configuration of the target computing system within the virtual machine image by activating each virtual container comprising an application identified by the profile for the target computing system;
   after configuring the virtual machine image to replicate the configuration of the target computing system, determining how the file would affect the target computing system by sending the file to the virtual machine image and analyzing how the file impacts the virtual machine image.

2. The method of claim 1, wherein identifying each application installed on the plurality of computing systems comprises at least one of:
   identifying, at a server that hosts the virtual machine image and is remote from each computing system in the plurality of computing systems, each application;
   deploying, to each computing system in the plurality of computing systems, a software agent that identifies each application on the computing system and sends information identifying each application to the server that hosts the virtual machine image.

3. The method of claim 1, wherein:
   identifying each application installed on the plurality of computing systems comprises identifying a version of each application;
   replicating the configuration of the target computing system comprises, for each application installed on the target computing system, activating the virtual container that comprises the version of the application.

4. The method of claim 1, wherein:
   creating the profile for each computing system further comprises, for each application installed on each computing system, mapping the application to a virtual container comprising the application;
   replicating the configuration of the target computing system comprises activating each virtual container mapped to each application installed on the target computing system.

5. The method of claim 1, further comprising updating the profile of at least one computing system in response to determining that the computing system was modified when at least one application on the computing system was:
   updated to a new version;
   deleted from the computing system; or
   newly installed on the computing system.

6. The method of claim 5, wherein updating the profile of the computing system comprises sending, from the computing system to a server that hosts the virtual machine image, information about the modification to the computing system.

7. The method of claim 1, wherein determining that the file is directed to the target computing system comprises intercepting the file prior to the file being used on the target computing system.

8. The method of claim 1, wherein analyzing how the file impacts the virtual machine image comprises identifying suspicious activity on the virtual machine image after the file is sent to the virtual machine image.

9. A system for replicating execution environments, the system comprising:
   an identification software module, stored in memory, that identifies each application installed on a plurality of computing systems and creates a profile for each computing system that identifies each application installed on the computing system;
   a creation software module, stored in memory, that creates, within a virtual machine image, virtual containers comprising each application installed on the plurality of computing systems;
   a determination software module, stored in memory, that determines that a potentially malicious file is directed to a target computing system within the plurality of computing systems;
   an application software module, stored in memory, that utilizes a profile for the target computing system to identify each application installed on the target computing system;
   a replication software module, stored in memory, that in response to determining that the file is directed to the target computing system, replicates a configuration of the target computing system within the virtual machine image by activating each virtual container comprising an application identified by the profile for the target computing system;
   an analysis software module, stored in memory, that after configuring the virtual machine image to replicate the configuration of the target computing system, determines how the file would affect the target computing system by sending the file to the virtual machine image and analyzing how the file impacts the virtual machine image;
at least one processor configured to execute the identification software module, the creation software module, the determination software module, the application software module, the replication software module, and the analysis software module.

10. The system of claim 9, wherein the identification software module identifies each application installed on the plurality of computing systems by at least one of:
identifying, at a server that hosts the virtual machine image and is remote from each computing system in the plurality of computing systems, each application;
deploying, to each computing system in the plurality of computing systems, a software agent that identifies each application on the computing system and sends information identifying each application to the server that hosts the virtual machine image.

11. The system of claim 9, wherein:
the identification software module identifies each application installed on the plurality of computing systems by identifying a version of each application;
the replication software module replicates the configuration of the target computing system by, for each application installed on the target computing system, activating the virtual container that comprises the version of the application.

12. The system of claim 9, wherein:
the creation software module further creates the profile for each computing system by, for each application installed on each computing system, mapping the application to a virtual container comprising the application;
the replication software module replicates the configuration of the target computing system by activating each virtual container mapped to each application installed on the target computing system.

13. The system of claim 9, further comprising an update software module that updates the profile of at least one computing system in response to determining that the computing system was modified when at least one application on the computing system was:
updated to a new version;
deleted from the computing system; or
newly installed on the computing system.

14. The system of claim 13, wherein the update software module updates the profile of the computing system by sending, from the computing system to a server that hosts the virtual machine image, information about the modification to the computing system.

15. The system of claim 9, wherein the analysis software module determines that the file is directed to the target computing system by intercepting the file prior to the file being used on the target computing system.

16. The system of claim 9, wherein the analysis software module analyzes how the file impacts the virtual machine image by identifying suspicious activity on the virtual machine image after the file is sent to the virtual machine image.

17. A non-transitory computer-readable medium comprising one or more computer-executable instructions that, when executed by at least one processor of a computing device, cause the computing device to:
identify each application installed on a plurality of computing systems and create a profile for each computing system that identifies each application installed on the computing system;
create, within a virtual machine image, virtual containers comprising each application installed on the plurality of computing systems;
determine that a potentially malicious file is directed to a target computing system within the plurality of computing systems;
utilize a profile for the target computing system to identify each application installed on the target computing system;
in response to determining that the file is directed to the target computing system, replicate a configuration of the target computing system within the virtual machine image by activating each virtual container comprising an application identified by the profile for the target computing system;
after configuring the virtual machine image to replicate the configuration of the target computing system, determine how the file would affect the target computing system by sending the file to the virtual machine image and analyzing how the file impacts the virtual machine image.

18. The computer-readable medium of claim 17, wherein the computer-executable instructions further cause the computing device to identify each application installed on the plurality of computing systems by at least one of:
identifying, at a server that hosts the virtual machine image and is remote from each computing system in the plurality of computing systems, each application;
deploying, to each computing system in the plurality of computing systems, a software agent that identifies each application on the computing system and sends information identifying each application to the server that hosts the virtual machine image.

19. The computer-readable medium of claim 17, wherein the computer-executable instructions further cause the computing device to:
identify each application installed on the plurality of computing systems by identifying a version of each application;
replicate the configuration of the target computing system by, for each application installed on the target computing system, activating the virtual container that comprises the version of the application.

20. The computer-readable medium of claim 17, wherein the computer-executable instructions further cause the computing device to:
create the profile for each computing system further by, for each application installed on each computing system, mapping the application to a virtual container comprising the application;
replicate the configuration of the target computing system by activating each virtual container mapped to each application installed on the target computing system.

* * * * *